Oct. 22, 1940.   R. O. WHITE   2,218,594
METHOD OF AND MEANS FOR COOLING FLUIDS
Filed Oct. 15, 1938   3 Sheets-Sheet 2

INVENTOR
ROBERT O. WHITE
BY
ATTORNEY

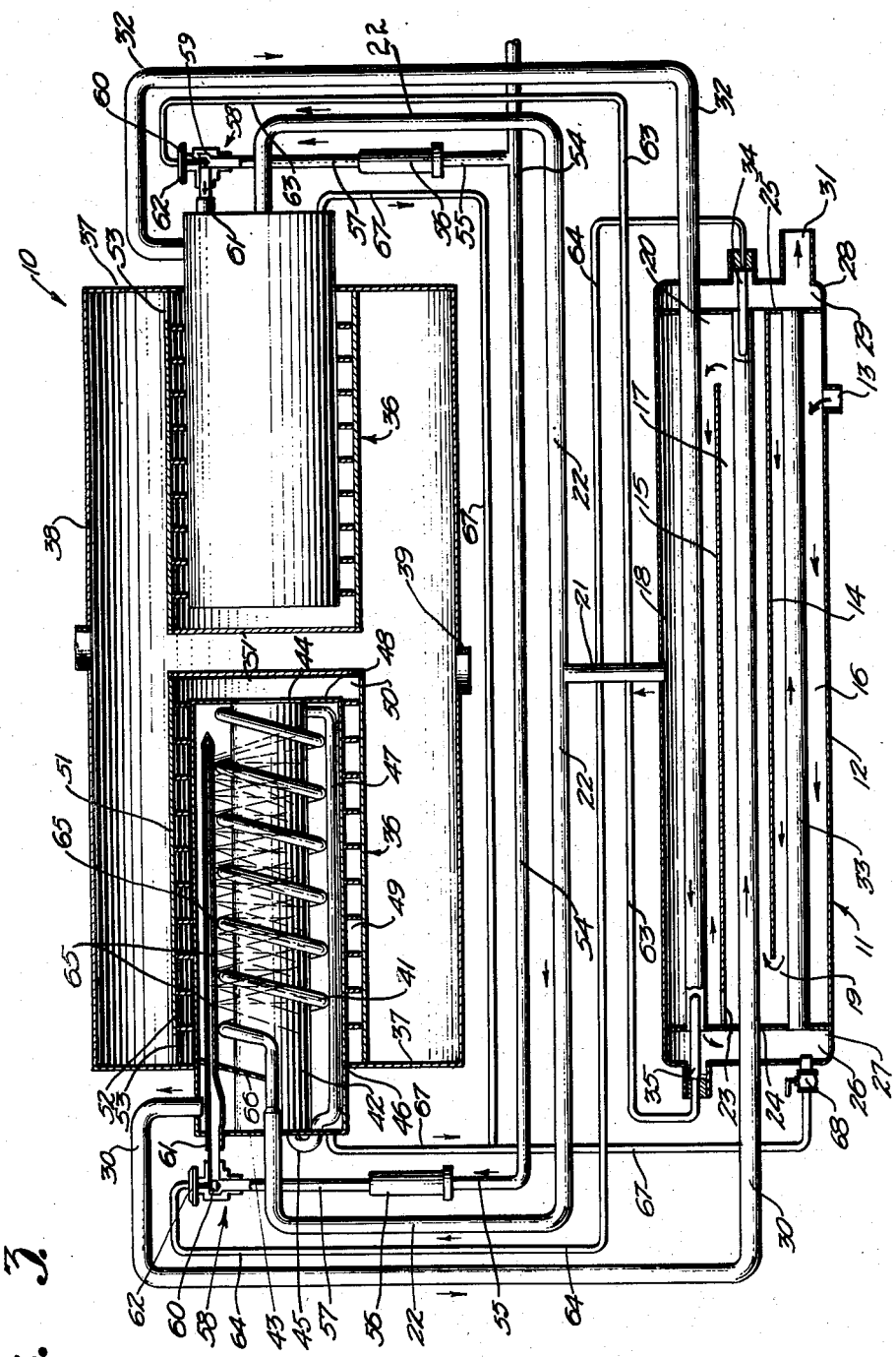

Patented Oct. 22, 1940

2,218,594

UNITED STATES PATENT OFFICE 2,218,594

METHOD OF AND MEANS FOR COOLING FLUIDS

Robert O. White, Manhattan Beach, Calif.

Application October 15, 1938, Serial No. 235,206

9 Claims. (Cl. 62—141)

This invention relates to cooling and refrigerating devices, and particularly pertains to a method of and means for cooling fluids.

At the present time various types of liquid cooling apparatus is employed for rapidly reducing the temperature of a liquid. Some of these devices bring about the exchange of heat in an open type cooler in which a liquid flows over the surface of a conduit within which a refrigerant is placed, the liquid flowing by gravity and being exposed to the atmosphere. Other coolers are of the closed type within which heat exchange is made by passing a liquid and a refrigerant through closed conduits disposed in heat exchange relation to ship to each other. It is the desire of designers of the closed type of equipment to provide apparatus which will automatically respond to variation occurring in the temperature of the liquid being cooled so that the flow of refrigerant may be controlled in direct proportion thereto. At the present time there are liquid coolers on the market which attempt to maintain this control by placing temperature responsive means in heat exchange relationship to the suction conduit of the apparatus through which effluent refrigerant flows and which heat responsive unit is operatively connected with a regulating valve in the influent line of refrigerant. It has been found, however, that due to the fact that usually the effluent refrigerant is not a dry vapor, but is saturated with unvaporized liquid particles the pressure responsive means will be effected by the relatively wet gas at a temperature lower than that at which the regulating valve is designed to respond so that the temperature control of the apparatus will be inaccurate, improper, and will cause the cooling structure to operate inefficiently. It is the principal object of the present invention therefor to provide a liquid cooling apparatus connected with refrigerant input, and suction lines, and which apparatus is provided with a regulating valve and pressure responsive means. The invention further contemplates the provision of means whereby the liquid particles in the wet effluent gas refrigerant will be vaporized by the heat of the inflowing stream of liquid to be cooled whereby dry gas will be provided for the pressure responsive means and the inflowing liquid will be initially heated incident thereto, thus making it possible to accurately and efficiently control the operating temperature of the apparatus and temperature of the liquid being cooled, whereby an increase and more efficient output will be provided.

The present invention contemplates the provision of a liquid storage tank within which one or more cooling units are placed and through which cooling units a refrigerant is circulated while a liquid to be cooled flows therethrough and to the storage tank. The structure further provides a heat exchanger into which the liquid to be cooled is initially introduced and through which the effluent refrigerant flows to be vaporized, a temperature responsive means being disposed in the flow of said vaporized refrigerant and controlling the flow of influent refrigerant to the cooling apparatus.

The invention is illustrated by way of example in the accompanying drawings in which:

Fig. 3 is a flow plan showing the present invention provided with a pair of evaporators.

Figure 1:
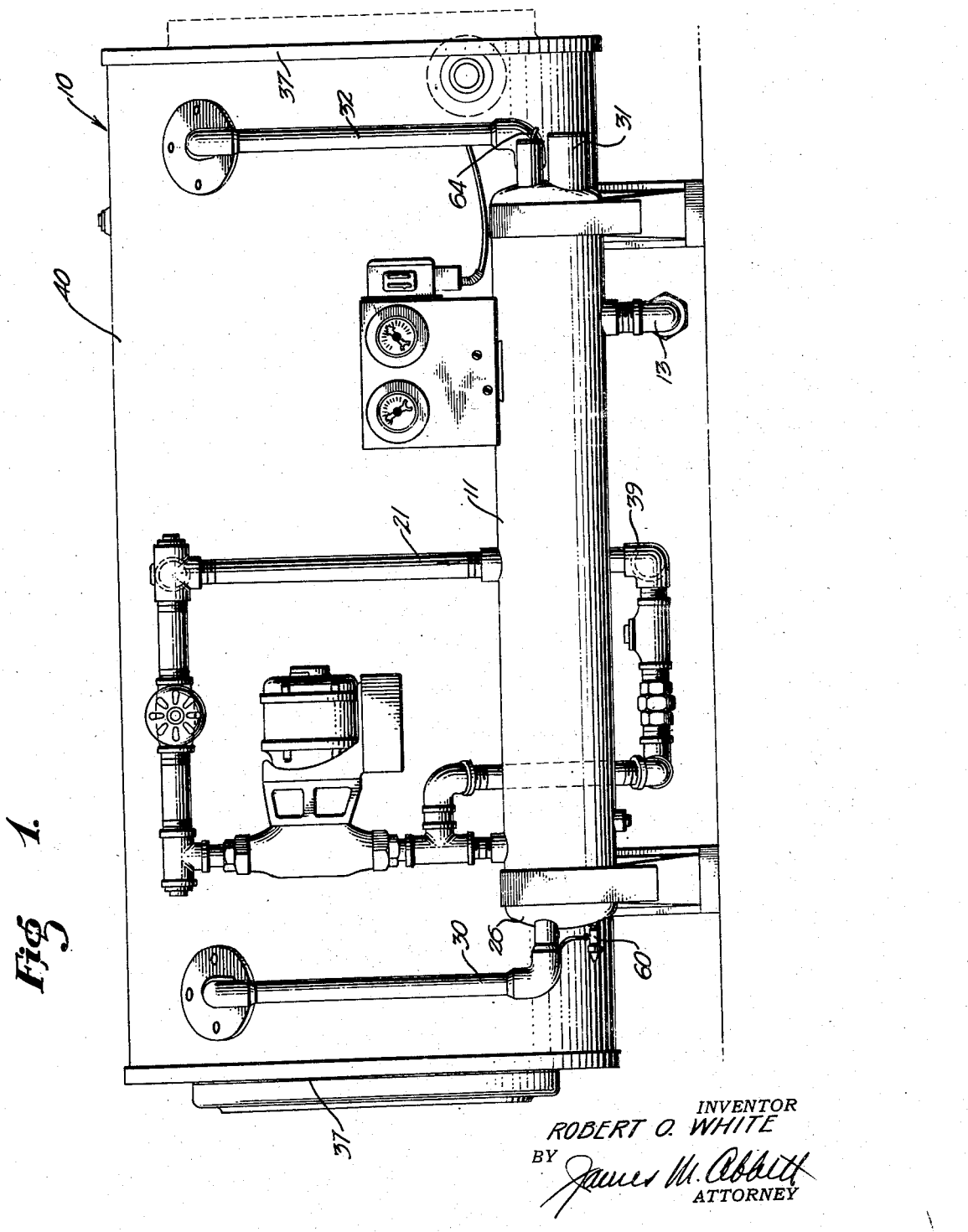
Figure 1 is a view in side elevation showing the cooler involving the details of the present invention.
Figure 2:
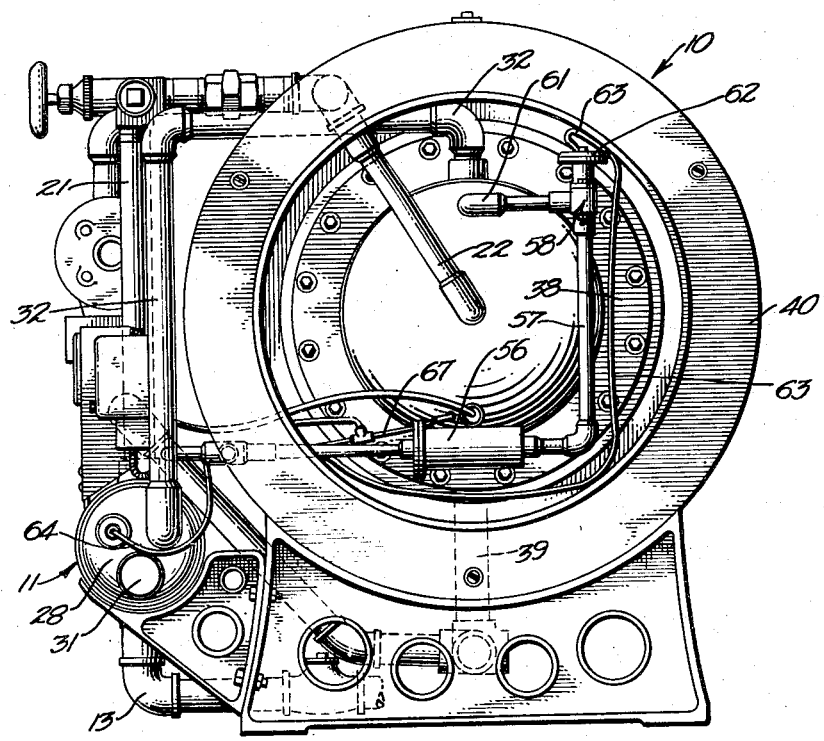
Fig. 2 is a view in end elevation showing the cooler and the details of the various fluid conduits.

Referring more particularly to the drawings 10 generally indicates a cooling unit comprising details of construction which will be hereinafter described, and 11 indicates a heat exchanger through which liquid to be cooled flows prior to flowing into the cooling unit 10. The heat exchanger comprises an outer shell 12 having a water inlet pipe 13 connected therewith. The shell is divided longitudinally as here shown in three passageways which are created by alternately staggered partition elements 14 and 15 along and around the opposite ends of which the inflowing liquid may pass. These passageways are here indicated at 16, 17, and 18. The liquid inlet 13 is disposed at one end of the passageway 16 and flows to the opposite end and through and opening 19 into the passageway 17 after which it flows lengthwise of the passageway 17 and then through an opening 20 into the passageway 18 from which it will flow through an eduction pipe 21 to the opposite lateral pipes 22. As here shown the eduction pipe 21 communicates with the shell midway the length thereof. This has been arranged to symmetrically balance the tubing arrangement in the apparatus. Under such conditions it is desirable to prevent the final end of the passageway 18 from accumulating stagnant fluid and a bypass opening 23 is formed through the longitudinal partition member 15 adjacent to the transverse partition member 24 of the shell. The opposite transverse partition member of the shell is indicated at 25. Spaced from the transverse partition member 24 is a shell head 26 forming a passageway 27 and spaced from the transverse partition member 25 is a shell head 28 forming a passageway 29. Extending centrally through the shell head 26 and the transverse partition member 24 is a suction tube 30 through which the effluent refrigerant passes to the transverse passageway 29 of the shell and then outwardly through the suction outlet pipe 31. Disposed within the shell and extending longitudinally thereof and parallel to the tube 30 is suction pipe 32 which extends through the passageway 18 and communicates with the transverse passageway 27 of the shell, after which the fluid therefrom flows through a shell tube 33 which establishes communication between the passageways 27 and 29. Extending into the opened end of the tube 30 is a temperature responsive control bulb 34 while extending into the open end of the tube 32 is a similar temperature responsive control bulb 35. The bulbs 34 and 35 are suitably mounted with relation to the heads 26 and 28 of the shell of the heat exchanger and are sealed within the structure. These bulbs may be of the general type in which a gas is used as the active medium in response to temperature changes. The liquid induction pipes 22 lead to evaporator units 36, two of which are shown in the present case. These units are mounted in the opposite ends of the cooler structure 10 and extend through heads 37 in the shell 38 of a liquid storage tank for the cooled liquid. An outlet connection 39 is provided for the shell 38 and through which the cooled liquid may be drawn off as required. An outer insulated jacket 40 is provided to enclose the shell 38 and to tend to insulate the storage compartment from the atmosphere.

The evaporator units 36 include a coil 41 which is wound around a cylindrical tubular element 42 here shown as extending horizontally and being closed at its outermost end by a head 43. The opposite end of the member 42 has a relatively large opening 44 leading therefrom while the terminal end of the coil 41 communicates with the closed end of the cylinder member 42 through a return bend 45 which passes through the head 43. Circumscribing the coil 41 and the tubular member 42 is a cylinder shell 46 which extends through the head 37 of the shell 38. This member encloses the coil and forms a cylindrical refrigerant space 47 since the head 43 closes one end of the shell 46 and an end member 48 forms a seal between and around the tubular member 42 and the shell 46. Circumscribing the shell 46 and extending throughout the length thereof is a helical partition member 49 which communicates at the outer end of the shell with a space 50 formed by a cylindrical drum 51 which fits over the helical element 49 and having an end wall 51' spaced from the end wall 48. The drum 51 and the helical member 49 form a continuous helical passageway 52 through which water flows from the open end 44 of the tubular member 42 to an outlet opening 53 which communicates directly with the storage tank 38. It is to be understood that while only one of the evaporator units has been described in detail that the evaporator units at opposite ends of the storage tank 38 are preferably identical. It is also to be understood that in some installations only one evaporating unit may be required. A refrigerant is supplied to the apparatus from a suitable compressor through a refrigerant supply pipe 54. This pipe is fitted with laterals 55, each of which leads to a suitable filter 56. A pipe 57 connects the filter 56 with a regulating valve 58. The valves 58 are formed with a valve seat 59 in conjunction with which a valve element 60 may operate to establish or interrupt flow of refrigerant from the pipe 57 to a manifold pipe 61. The valve element 60 may be moved by suitable fluid responsive means generally indicated at 62 and which fluid responsive means is in communication with the control bulbs 34 or 35 as the case may be, through tubes 63 and 64 respectively. The refrigerant manifolds 61 extend longitudinally along the space 47 within the shell 46 of each evaporator. These manifolds have outlet perforations 65 in their under faces so that jets of refrigerant will be created and will be projected downwardly to impinge against the surface of the coils 41 and the surface of the tubular liquid member 42. A suitable perforated baffle 66 is provided near the induction end of the manifold 61 and separates the main space 47 from the outlet opening with which the refrigerant suction pipe 30 communicates.

In view of the fact that oil becomes entrained within the refrigerant delivered from a compressor, this oil accumulates within the space 47 of the shell 46 and it is drained off through drain pipes 67 which lead to the bottom of the heat exchanger where a control valve 68 is provided to admit it to the fluid space in the heat exchanger.

In operation of the present invention the liquid to be cooled, such as water for example, is delivered from a source of supply through the pipe 13 and introduced into the heat exchanger 11. This water fills the entire system and the storage tank 38. At the same time suitable refrigerant compressor and suction means are connected with pipes 54 and 31 respectively. A liquid refrigerant is pumped through the pipe 54 to the two lateral pipes 55 and then through the filters 56 to the valves 60. If the liquid within the evaporators 36 is at a relatively high temperature the valve element 60 will stand open to permit the entry of the liquid refrigerant, these valves being controlled in steps of procedure to be hereinafter described. The liquid, such as water, passing through the pipe 13 to the heat exchanger 11 may be for example at a temperature of 70° F. It then flows along the longitudinal passageways 16, 17, and 18 of the heat exchanger, passes through the outlet pipe 21 to the pipes 22 and then through the coils 41 within the evaporators 36. While passing through these coils its temperature is lowered due to the fact that the liquid refrigerant which is forced into the evaporators through the manifolds 61 will be forced through the openings 65 of the manifolds and will be discharged against the surface of the coils 41. At the same time the refrigerant will gasify and will fill the space 47 within the shell 46. This gasification process may not be completed, however, so that liquid refrigerant in suspension will be carried by the gas as the gas is drawn from the shell 46 through the pipe 30 under influence of suction imposed upon the system by the suction means which is connected with the pipe 31 of the heat exchanger 11. The water while subject to this cooling action as it flows through the coil will be reduced to a temperature of approximately 45° F. It will then be introduced into the outermost end of the tubular member 42 and will flow through this member, thereafter being discharged at 44 into the drum 51. Here it will pass along the helical passageway 52 within the drum 51 at which time it will be in heat exchange relationship to the wall of the shell 46 so that its temperature will be further lowered. It will then be delivered into the storage tank 38 through the opening 53. In the example here described the final temperature of the water when delivered into the storage tank may be approximately 40° F. The refrigerant which was forced into the system through the pipe 54 will be at a pressure of approximately 100# per square inch, and when it is withdrawn from the apparatus through the pipe 31 it will be under an appreciable negative pressure, thus insuring proper circulation of the refrigerant through the apparatus, both in its liquid and gaseous form.

A novel feature of the present invention is the provision of the heat exchanger through which the gaseous refrigerant passes in heat exchange relationship to the liquid to be cooled, as it enters the system. Due to this arrangement numerous advantages are obtained, including the initial drop in temperature of the liquid to be cooled, thus obtaining more work from the refrigerant being used so that a larger output of cooled liquid is obtained, and the action of the relatively warm liquid to further vaporize the gaseous refrigerant so that a zone will occur in which the gas will be relatively dry. This relatively dry gas will then give a correct dry bulb temperature herein whereas its temperature reading when wet would have been an inaccurate indication of the true temperature of the refrigerant since the temperature would have indicated a lower temperature than the actual temperature existing. Furthermore it will be evident that under different conditions of partial saturation of the gas the wet bulb temperature would vary. For that reason the control bulbs 34 and 35 have been placed in heat exchange relationship to the gaseous refrigerant after the refrigerant has been subjected to the vaporizing action of the relatively warm liquid which flows through the heat exchanger. This insures that the control bulbs 34 and 35 will be subjected to the action of the gaseous refrigerant at dry bulb temperatures. The gas within the control bulbs will thus expand and contract in volume in direct response to variation in dry bulb temperatures of the gaseous refrigerant and will effect the regulating valves 58 accordingly. When the dry bulb temperatures are high the regulating valves 58 will be opened to increase the volume of liquid refrigerant delivered to the manifold 61. When the dry bulb temperatures of the gaseous refrigerant become lowered the valve structures 58 will appropriately close. In this manner a substantially uniform temperature may be maintained in the liquid impounded in the storage tank 38.

The heat exchanger and the control arrangement are here shown in connection with one type of device. It is to be understood, however, that the heat exchanger might be used to pre-cool any liquid passing to an apparatus by a return flow of gaseous refrigerant or any other fluid cooling agent which might be passed in heat exchange relationship to the initially introduced liquid to be cooled, and it will also be evident that since an incident action of this heat exchange relationship results in vaporizing the gaseous refrigerant and drying it that the temperature responsive apparatus of any type might be associated therewith.

It will thus be seen that the invention here disclosed provides a compact and efficient fluid cooler of high capacity which will actively and efficiently cool the fluid and maintain the fluid in storage at a predetermined set temperature.

While I have shown the preferred method of establishing and maintaining a predetermined cooling action in a liquid, and a preferred form of apparatus for carrying out the steps of the method, it is to be understood that various changes could be made in the combination, construction, and arrangement of the parts of the apparatus, and suitable changes in the steps of the method, which might occur to those skilled in the art, without departing from the spirit of the invention as claimed.

Having thus described my invention, what I claim and desire to secure by Letters Patent is:

1. A method of controlling the temperature of a liquid which is subjected to the cooling action of a refrigerant which consists in passing the liquid through a conduit to a cooler and passing a liquid refrigerant to the cooler and then withdrawing it therefrom, the withdrawn refrigerant and entering liquid to be cooled by thereafter passing in counterflow and heat exchange relationship to each other prior to the entry of the liquid to be cooled into the cooler, said entering refrigerant being provided with a control flow valve, and placing temperature responsive means in the stream of withdrawn refrigerant after it has passed in heat exchange relationship to the entering liquid to be cooled whereby to initiate operation of the control valve.

2. A liquid cooler comprising a storage tank, a cooling unit therein through which liquid to be cooled enters the tank and through which a refrigerant circulates to reduce the temperature of the liquid, a regulating valve for controlling the entry of refrigerant to said cooling unit, a heat exchanger through which the inflowing liquid to be cooled passes to the cooler and through which outflowing refrigerant passes from the cooler whereby the temperature of the inflowing liquid will be lowered by the spent refrigerant and means responsive to temperature difference between the two fluids in the heat exchanger for actuating said regulating valve.

3. A liquid cooler comprising a storage tank, a cooling unit therein through which liquid to be cooled enters the tank and through which a refrigerant circulates to reduce the temperature of the liquid, a regulating valve for controlling the entry of refrigerant to said cooling unit, a heat exchanger through which the inflowing liquid to be cooled passes to the cooler and through which outflowing refrigerant passes from the cooler whereby the temperature of the inflowing liquid will be lowered by the spent refrigerant, whereby the refrigerant gas drawn off from the cooler will be dried as it passes through the heat exchanger and means responsive to temperature difference between the two fluids in the heat exchanger for actuating said regulating valve.

4. A liquid cooler comprising a storage tank, a cooling unit therein through which liquid to be cooled enters the tank and through which a refrigerant circulates to reduce the temperature of the liquid, a regulating valve for controlling the entry of refrigerant to said cooling unit, a heat exchanger through which the inflowing liquid to be cooled passes to the cooler and through which outflowing refrigerant passes from the cooler whereby the temperature of the inflowing liquid will be lowered by the spent refrigerant and whereby the refrigerant gas drawn off from the cooler will be dried as it passes through the heat exchanger, and temperature responsive means disposed in the path of the gaseous refrigerant after it has been dried in the heat exchanger to regulate the fluid regulating valve and thereby control the temperature of the cooled liquid.

5. A liquid cooler of the storage type which comprises a liquid storage tank, a heat exchanger through which influent liquid to be cooled passes, a cooling unit through which said influent liquid passes from the heat exchanger and to the storage tank, a cooling chamber within the cooling unit and to which a liquid refrigerant is delivered, a return conduit through which gaseous refrigerant is drawn to the heat exchanger and therethrough, and whereby the gaseous refrigerant and inflowing liquid will pass in heat exchange relation to each other to lower the temperature of the liquid and to raise the temperature of the gaseous refrigerant while drying the same.

6. A liquid cooler comprising a storage tank from which cooled liquid may be drawn, a heat exchanger through which liquid to be cooled passes, a cooler disposed between the storage tank and the heat exchanger and through which the liquid to be cooled flows in transit from the heat exchanger to the storage tank, a conduit through which liquid refrigerant is delivered to the cooler, a regulating valve for controlling flow of liquid refrigerant from the conduit to the cooler, a cooling chamber within the conduit and into which said liquid refrigerant is released to assume a vaporous state, a draw-off conduit in communication with said cooling chamber and connected with the heat exchanger, and through which gaseous refrigerant flows in heat exchange relationship to the liquid flowing through the heat exchanger, and temperature responsive means within the heat exchanger and within the path of travel of said gaseous refrigerant, said temperature responsive means being operatively connected with the control valve whereby variation of the gaseous refrigerant within the heat exchanger will proportionately effect the control.

7. A cooling unit, a refrigerant chamber therein, passageways therein for a liquid to be cooled, a conduit supplying said liquid thereto, a manifold within the refrigerant chamber, a liquid refrigerant conduit connected therewith and delivering liquid refrigerant to the manifold, said manifold having a perforate wall through which the liquid refrigerant is liberated, and a draw-off pipe communicating with the refrigerant chamber and through which the refrigerant vapor is drawn from the cooler.

8. A cooling unit, a refrigerant chamber therein, passageways therein for a liquid to be cooled, a conduit supplying said liquid thereto, a manifold within the refrigerant chamber, a liquid refrigerant conduit connected therewith and delivering liquid refrigerant to the manifold, said manifold having a perforate wall through which the liquid refrigerant is liberated, a draw-off pipe communicating with the refrigerant chamber and through which the refrigerant vapor is drawn from the cooler, and an intermediate perforate baffle wall disposed between the draw-off pipe outlet and the body of the refrigerant chamber and through which the gaseous refrigerant passes to the outlet pipe and by which the outflow of suspended liquid particles is retarded.

9. A cooling unit, a refrigerant chamber therein, passageways therein for a liquid to be cooled, a conduit supplying said liquid thereto, a manifold within the refrigerant chamber, a liquid refrigerant conduit connected therewith and delivering liquid refrigerant to the manifold, said manifold having a perforate wall through which the liquid refrigerant is liberated, a draw-off pipe communicating with the refrigerant chamber and through which the refrigerant vapor is drawn from the cooler, an intermediate perforate baffle wall disposed between the draw-off pipe outlet and the body of the refrigerant chamber and through which the gaseous refrigerant passes to the outlet pipe and by which the outflow of suspended liquid particles is retarded, fluid regulating means for the liquid refrigerant, and temperature responsive means effected by variation in the temperature of the gaseous refrigerant passing from the cooler whereby the fluid regulating means will be adjusted.

ROBERT O. WHITE.